United States Patent
Gupta et al.

(10) Patent No.: US 9,884,438 B2
(45) Date of Patent: Feb. 6, 2018

(54) IMPACT RESISTANT DOOR FACING, METHOD OF FORMING IMPACT RESISTANT DOOR FACING, AND DOOR FORMED THEREWITH

(75) Inventors: Manish Gupta, Aurora, IL (US);
Tamra Williams, Laurel, MS (US);
Tank Lonnie Reid, Dickson, TN (US)

(73) Assignee: Masonite Corporation, Tampa, FL (US)

( * ) Notice: Subject to any disclaimer, the term of this patent is extended or adjusted under 35 U.S.C. 154(b) by 2232 days.

(21) Appl. No.: 11/232,238

(22) Filed: Sep. 22, 2005

(65) Prior Publication Data
US 2006/0070347 A1    Apr. 6, 2006

Related U.S. Application Data

(60) Provisional application No. 60/612,251, filed on Sep. 23, 2004.

(51) Int. Cl.
| | |
|---|---|
| *E06B 5/12* | (2006.01) |
| *B29C 43/20* | (2006.01) |
| *B29C 70/46* | (2006.01) |
| *E06B 3/82* | (2006.01) |
| *B29C 43/02* | (2006.01) |
| *B29L 31/00* | (2006.01) |
| *E06B 3/70* | (2006.01) |

(52) U.S. Cl.
CPC .......... *B29C 43/203* (2013.01); *B29C 70/467* (2013.01); *E06B 3/822* (2013.01); *E06B 5/12* (2013.01); *B29C 2043/023* (2013.01); *B29L 2031/724* (2013.01); *B29L 2031/772* (2013.01); *E06B 2003/7051* (2013.01)

(58) Field of Classification Search
CPC ................ B29C 43/203; B29C 70/467; B29C 2043/023; E06B 5/12; E06B 3/822; E06B 2003/7051; B29L 2031/772; B29L 2031/724
USPC ....... 428/304, 113; 525/400; 52/456; 264/35
See application file for complete search history.

(56) References Cited

U.S. PATENT DOCUMENTS

| | | | |
|---|---|---|---|
| 1,661,982 A * | 3/1928 | Wanat .............................. 70/352 |
| 3,950,894 A | 4/1976 | DiMaio | |
| 4,293,659 A * | 10/1981 | Svoboda ......................... 525/28 |
| 4,340,562 A * | 7/1982 | Gross et al. ................ 264/328.2 |
| 4,356,230 A * | 10/1982 | Emanuel et al. ............. 442/180 |
| 4,532,169 A * | 7/1985 | Carley .......................... 428/109 |
| 4,550,540 A | 11/1985 | Thorn | |

(Continued)

OTHER PUBLICATIONS

"1986 Chrysler Town & Country Wagon," published Aug. 2005, car sold 1986 model year, Murrayco LLC, http://www.murrayco.com/Car_Collection/1986%20Chrysler%20Town%20&%20Country.html.*

*Primary Examiner* — Nicholas Kokkinos
(74) *Attorney, Agent, or Firm* — Berenato & White, LLC

(57) ABSTRACT

The present invention is directed to an impact resistant door facing. The facing includes a rectangular sheet of molded hardened polymeric material having first and second opposing major surfaces. A mat having a continuous structure is integrally molded into the sheet. The mat is sufficiently porous to allow the polymeric material to permeate the mat prior to the polymeric material having hardened. The mat is disposed within the sheet so that at least one of the major surfaces is unbroken. The present invention also relates to a method of forming the disclosed door facing, and a door formed therewith.

10 Claims, 2 Drawing Sheets

(56) References Cited

U.S. PATENT DOCUMENTS

| | | | |
|---|---|---|---|
| 4,668,460 A * | 5/1987 | Ongena | 264/255 |
| 4,720,951 A | 1/1988 | Thorn | |
| 4,824,507 A * | 4/1989 | D'Amico | 156/245 |
| 5,009,821 A * | 4/1991 | Weaver | 264/446 |
| 5,032,199 A * | 7/1991 | Landry et al. | 156/149 |
| 5,342,554 A * | 8/1994 | McBain et al. | 523/466 |
| 5,433,998 A * | 7/1995 | Curzio et al. | 442/187 |
| 5,537,789 A | 7/1996 | Mlnke | |
| 5,562,979 A * | 10/1996 | Easterlow et al. | 428/327 |
| 5,932,314 A | 8/1999 | West | |
| 6,092,343 A | 7/2000 | West | |
| 6,226,958 B1 | 5/2001 | West | |
| 6,453,638 B2 | 9/2002 | Chen | |
| 6,487,824 B1 | 12/2002 | West | |
| 6,576,331 B1 * | 6/2003 | Ryan | 428/297.4 |
| 6,740,279 B2 | 5/2004 | West | |
| 6,991,694 B2 * | 1/2006 | Roehr | 156/245 |
| 2001/0001356 A1 | 5/2001 | West | |
| 2002/0042468 A1 * | 4/2002 | Choi et al. | 524/494 |
| 2002/0135202 A1 * | 9/2002 | Rokahr | 296/136 |
| 2002/0184849 A1 | 12/2002 | Chen | |
| 2003/0007797 A1 | 1/2003 | Onozuka et al. | |
| 2003/0082344 A1 * | 5/2003 | Straus et al. | 428/172 |
| 2003/0084639 A1 * | 5/2003 | Wang Chen | 52/784.1 |
| 2003/0155066 A1 * | 8/2003 | Roehr | 156/245 |
| 2003/0226328 A1 * | 12/2003 | West et al. | 52/309.9 |
| 2004/0003559 A1 | 1/2004 | Minke | |
| 2004/0007797 A1 | 1/2004 | Minke et al. | |

* cited by examiner

IMPACT RESISTANT DOOR FACING, METHOD OF FORMING IMPACT RESISTANT DOOR FACING, AND DOOR FORMED THEREWITH

CROSS-REFERENCE TO RELATED APPLICATION AND CLAIM TO PRIORITY

This application is based on and claims the benefit of priority of provisional application Ser. No. 60/612,251, filed Sep. 23, 2004, for Manish Gupta et al., the disclosure of which is incorporated herein by reference and to which priority is claimed under 35 U.S.C. § 119.

FIELD OF THE INVENTION

The present invention is directed to an impact resistant door facing. The facing includes a rectangular sheet of molded hardened polymeric material having first and second opposing major surfaces. A mat having a continuous structure is integrally molded into the sheet. The mat is sufficiently porous to allow the polymeric material to permeate the mat prior to the polymeric material having hardened. The mat is disposed within the sheet so that at least one of the major surfaces is unbroken. The present invention also relates to a method of forming the disclosed door facing, and a door formed therewith.

BACKGROUND OF THE INVENTION

As known in the art, door facings may be secured to a support structure or frame to form a hollow core door. Such facings may be molded from a polymeric material, such as sheet molding compound ("SMC"). SMC may be molded to form a door facing including one or more depressions or grooves, such as one or more square or rectangular depressions. These depressions may define the perimeter of one or more simulated panels. Alternatively, the facings may be flush.

The door facings are secured to opposing sides of the frame, forming hollow spaces between the facings. A core component or material is sometimes used to fill the hollow spaces. Conventional core materials for use in hollow core doors include corrugated cardboard, paper, foam, or fiberboard.

It is sometimes desirable to provide an exterior door that can withstand impacts from flying debris, such as in a high velocity wind zones. Doors are sometimes required to pass certain performance tests, such as those developed by the American Society of Testing Materials (ASTM) which test the performance of doors exposed to the effects of windstorms and impact testing. Doors may also be required to meet regional performance tests within a particular state, such as the Dade County, Fla., hurricane impact test. The Dade County test requires that the inner door surface have a crack, if at all, smaller than $\frac{1}{16}$ inch by 6 inches.

Various attempts have been made to provide a hollow core door that can withstand impact testing. One design provides a hollow core door having a mat disposed within the door cavity and between the opposing door facings. A cementitious material is poured around the mat. Such doors are relatively expensive and difficult to assemble. In addition, they are relatively heavy, and therefore difficult to store, transport and install. Other designs provide for metal door facings. Such doors are also relatively expensive. In addition, they are often less desirable to consumers because they lack aesthetic detail, and may rust and dent.

Therefore, there is a need for an impact resistant door that overcomes some or all of the above noted problems and disadvantages.

SUMMARY OF THE INVENTION

The present invention is directed to an impact resistant door facing. The facing includes a rectangular sheet of molded hardened polymeric material having first and second opposing major surfaces. A mat having a continuous structure is integrally molded into the sheet. The mat is sufficiently porous to allow the polymeric material to permeate the mat prior to the polymeric material having hardened. The mat is disposed within the sheet so that at least one of the major surfaces is unbroken.

An impact resistant door is also disclosed. The door includes a peripheral frame, and first and second door facings secured to opposing sides of the frame. At least one of the facings comprises a rectangular sheet of molded hardened polymeric material having first and second opposing major surfaces. A mat having a continuous structure is integrally molded into the sheet. The mat is sufficiently porous to allow the polymeric material to permeate the mat prior to the polymeric material having hardened. The mat is disposed within the sheet so that at least one of the major surfaces is unbroken.

The present invention also relates to a method of forming an impact resistant door facing. A die mold is provided having first and second dies defining a cavity. A mat having a continuous structure is disposed within the cavity. A sheet of polymeric material is disposed on the mat. The mat and sheet are compressed between the first and second dies using heat and pressure. The mat is sufficiently porous to allow the polymeric material to permeate the mat during the compression process, thereby forming a door facing having first and second opposing major surface and a continuous structure integrally molded into the sheet so that one of the major surfaces is unbroken.

DETAILED DESCRIPTION OF THE INVENTION

Figure 1:
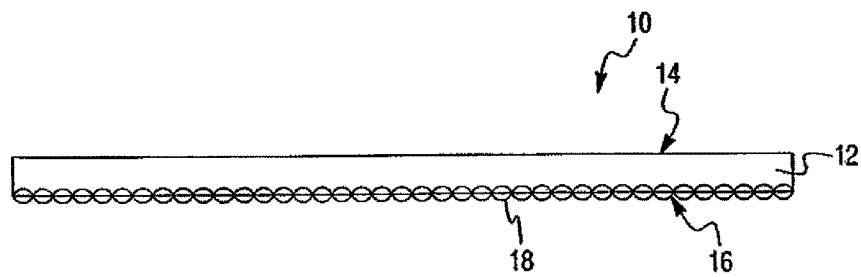
FIG. 1 is a cross-sectional view of an impact resistant door facing according to the present invention.

As best shown in FIG. 1, an impact resistant door facing 10 includes a rectangular sheet 12 of molded hardened polymeric material having first and second opposing major surfaces 14, 16. A mat 18 is integrally molded into the polymeric material. Mat 18 is preferably woven or knitted. Non-woven fabrics may be used, such as fiberglass felts, provided that they have a continuous structure to which the polymer may bind. Mat 18 has a porosity sufficient to allow the polymeric material to permeate mat 18 prior to the polymeric material having hardened, but not so high as to cause the mat 18 to float within the mold cavity during the pressing step. Mat 18 is disposed within sheet 12 so that at least one of major surfaces 14 is unbroken, thus providing a surface having a surface finish and quality suitable for the exterior surface of a door. Optionally, one of the opposite major surface 16 may be broken by the mat 18.

The polymeric material used to form sheet 12 is preferably an sheet-molding compound ("SMC"), such as from unsaturated polyester resin, having at least about 10% by weight chopped fiberglass and up to about 18% by weight chopped fiberglass. Mat 18 is preferably a woven or knitted fiberglass fabric having a weight of at least about ten ounces per square yard. The thickness of mat 18 may vary depending on the ultimate thickness of sheet 12, but is preferably between about 0.0005 inch and about 0.0015 inch. Suitable fiberglass fabrics for use in the present invention are commercially available. For example, Owens Corning manufactures knitted fiberglass matting with a weight of 10 oz./sq. yd. Hexcel manufactures an E-glass fabric with 11 oz/sq. yd. While we prefer the use of fiberglass for the mat 18, other reinforcing filaments may be used to form mat 18.

Mat 18 may be pre-treated with an adhesive resin, or impregnated with an SMC paste. It is somewhat easier to handle and cut the fibrous material of mat 18 when it is impregnated with resin or paste. The SMC paste preferably comprises unsaturated polyester resin, filler, such as calcium carbonate, and a catalyst, such as a peroxide. Preferably, the viscosity of the paste is about 40 million centipoise or less. The SMC paste is preferably fiberglass free. Mat 18 is preferably includes a sufficient amount of adhesive resin or paste to fully wet out mat 18.

The weave or porosity of mat 18 may vary depending on the viscosity of the SMC paste. Mat 18 should be sufficiently porous to allow the polymeric material to permeate mat 18 and wet the fibers thereof prior to the polymeric material having hardened. Preferably, mat 18 has a weave finer than about 5 by 5 pics per square inch, more preferably mat 18 has a weave of 10 by 10 pics per square inch. As the viscosity of the SMC is increased, the weave of mat 18 may become more course.

Figure 2:
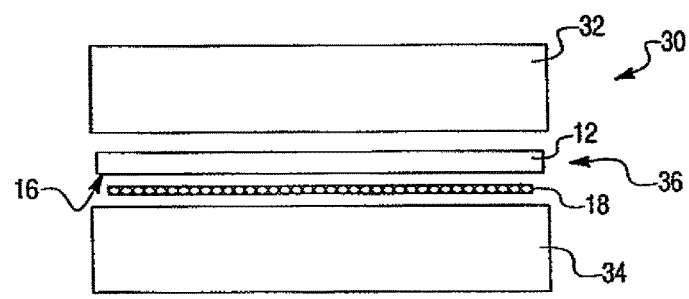
FIG. 2 is a cross-sectional view of a die mold with a sheet of polymeric material and mat disposed therein prior to compression.

Mat 18 is integrally molded into sheet 12 during formation of facing 10. As best shown in FIG. 2, a die mold 30 is provided which includes upper and lower dies 32, 34 defining a cavity 36. Mat 18 is disposed within cavity 36. One or more strips of SMC material are positioned on top of mat 18 within the mold cavity formed by dies 32,34. The SMC strips preferable are about 6 inches wide and about 50 inches long. The number and orientation of the SMC strips is a function of the size and configuration of the sheet 12 to be created. Mat 18 and the SMC strips are compressed together between upper and lower dies 32, 34 using heat and pressure. Preferably, cavity 36 is maintained at a temperature of between about 275° F. and about 350° F. during the compression process. Dies 32, 34 preferably exert a pressure on mat 18 and the SMC strips of at least about 2800 tons pressure per square inch, more preferably at least about 3200 tons pressure per square inch.

During compression, the polymeric material is caused to flow throughout the mold cavity created by dies 32,34. The porosity of mat 18 is sufficient to allow the softened polymeric material to permeate the mat during compression, wet the glass fibers, and thereby be able to bind to the fibers of mat 18. In this way, the polymeric material flows around the fiberglass structure comprising mat 18. However, the weave of mat 18 is also sufficiently fine, and the compression process is controlled, such that mat 18 is not pressed through first major surface 14. Rather, first major surface 14 is unbroken by mat 18, thereby ensuring a desirable surface quality of facing 10. Using the exemplary compression parameters herein, the SMC strips and mat 18 may be compressed in mold 30 for about fifty seconds.

Alternatively, mat 18 may be adhesively secured to second major surface 16. Preferably, mat 18 is impregnated with an SMC paste, as described above. A sufficient amount of heat and pressure are applied to mat 18 and sheet 12, so that the SMC paste in mat 18 is integrally bonded with the polymeric material of sheet 12. In this way, the continuous structure of mat 18 is also intimately bonded to sheet 12.

Mat 18 may have dimensions substantially the same as sheet 12. With some molding equipment, it is may be advantageous to provide a mat 18 having dimensions slightly smaller than the dimensions of the sheet 12, for example mat 18 may have perimeter edges that are spaced from the perimeter edges of sheet 12. In this way, the edges of sheet 12 may be easily cut using conventional molding equipment, given it is sometimes more difficult for the molding equipment to cut through the fiberglass mat 18.

Figure 3:
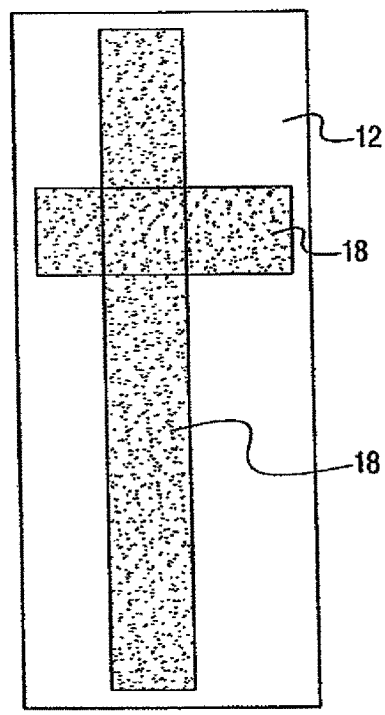
FIG. 3 is an elevational view of an impact resistant door facing having two integrally molded pieces of mat arranged in a cross configuration.
Figure 4:
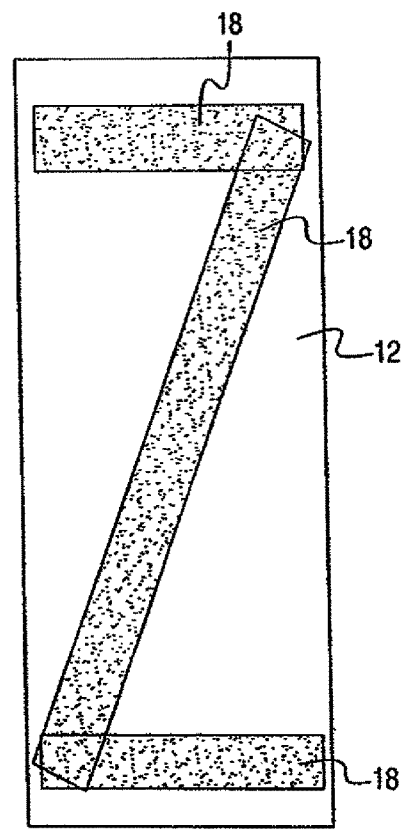
FIG. 4 is an elevational view of an impact resistant door facing having three integrally molded pieces of mat arranged in a Z configuration.

Facing 10 may include one piece of mat 18 molded into sheet 12. Alternatively, two or more pieces of mat 18 may be molded into sheet 12. For example, two pieces of mat 18 may be arranged in a cross configuration in sheet 12 as best shown in FIG. 3, or three pieces of mat 18 may be arranged in a 'Z' configuration in sheet 12 as best shown in FIG. 4. It should be understood that mat 18 may have any shape or dimensions, and any number of pieces of mat 18 may be used and arranged in various configurations, so long as mat 18 is integrally molded into a sufficient portion of facing 10 so that stresses are dissipated throughout a substantially portion of facing 10.

The resulting door facing 10 has a significantly higher impact strength compared to conventional polymeric facing lacking the continuous structure of mat 18. Facing 10 is impact resistant under ASTM test methods and the Dade County, Fla. hurricane test because mat 18 dissipates stresses from impacts to first major surface 14 due to its continuous structure, which distributes the force of impacts over the entire surface of facing 10. The surface 14 is thus an engineered structure that dissipates energy arising from impacts, such as impacts attributable to hurricanes.

Figure 5:
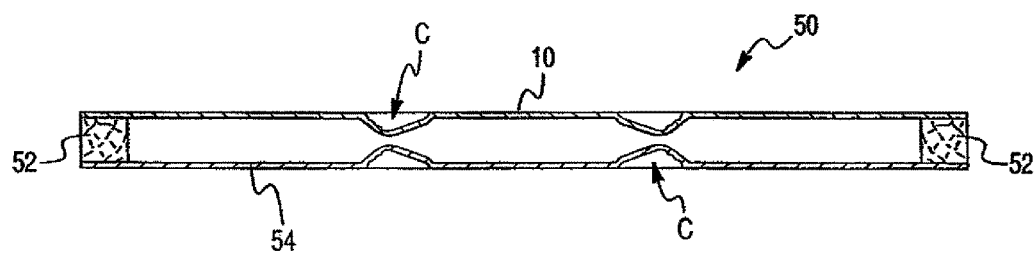
FIG. 5 is a cross-sectional view of an impact resistant door having one impact resistant door facing.

An impact resistant door 50 may be formed using at least one impact resistant facing 10, as best shown in FIG. 5. Door 50 includes a peripheral frame 52, at least one impact resistant door facing 10 secured to one side of frame 52, and a second door facing 54 secured to the opposing side of frame 52. As clearly shown in FIG. 5, in the illustrated embodiment the outer boundaries of the first and second door facings 10 and 54 terminate substantially at respective edges of the peripheral frame 52. In this embodiment, the outer edges of the peripheral frame 52 define the outer edges of the door 50. If door 50 includes only one impact resistant facing 10, door 50 should be installed such that facing 10 is exteriorly disposed to the environment. Alternatively, second door facing 54 may also be an impact resistant door facing, such as facing 10. Door 50 is impact resistant under ASTM test methods and the Dade County, Fla. hurricane standards because facing 10 on door 50 dissipates impact energy across its entire surface as described above.

Door 50 may also include a core material or component disposed between first and second facings 10, 54. Note that door 50 may have a substantially planar exterior surface (i.e. a flush door), or include contoured portions C simulating door panels, as shown in FIG. 5. Accordingly, mat 18 is sufficiently flexible so that it may be integrally molded into sheet 12 even in contoured portions C. Exteriorly disposed surfaces, including first major surface 14 of facing 10, may include a textured or decorative surface, such as a wood grain pattern thereon.

Certain aspects of the present invention have been explained with respect to specific embodiments. However, it will be apparent to one of ordinary skill in the art that various modifications and variations can be made in construction or configuration of the present invention without departing from the scope or spirit of the invention. Therefore, it is intended that the present invention cover all such modifications and variations, provided they come within the scope of the following claims and their equivalents.

We claim as follows:

1. An impact resistant door facing, consisting essentially of:
   a compression molded, hardened rectangular sheet comprising a sheet molding compound, the sheet molding compound establishing first and second opposing major surfaces of the compression molded, hardened rectangular sheet; and
   a porous mat having a continuous structure integrally molded into and permeated by the sheet molding compound, wherein at least one of the major surfaces made of the sheet molding compound is unbroken by the porous mat, wherein the porous mat comprises a first piece of porous mat and a second piece of porous mat and wherein each of the first piece of the porous mat and the second piece of the porous mat has a rectangular configuration, wherein the first piece of the porous mat overlaps the second piece of the porous mat in a cross configuration.

2. An impact resistant door facing, consisting essentially of:
   a compression molded, hardened rectangular sheet comprising a sheet molding compound, the sheet molding compound establishing first and second opposing major surfaces of the compression molded, hardened rectangular sheet; and
   a porous mat having a continuous structure integrally molded into and permeated by the sheet molding compound, wherein at least one of the major surfaces made of the sheet molding compound is unbroken by the porous mat, wherein the porous mat comprises a first piece of porous mat and a second piece of porous mat, wherein each of the first piece of the porous mat and the second piece of the porous mat has a rectangular configuration, and wherein the porous mat further comprises a third piece of porous mat and wherein the first piece of the porous mat, the second piece of the porous mat, and the third piece of the porous mat are arranged in a 'Z' configuration.

3. An impact resistant door, comprising:
   a peripheral frame defining an outer edge of the door; and
   first and second door facings secured to opposing sides of said frame, said door facings having rectangular outer boundaries that terminate substantially at respective edges of the peripheral frame, wherein a core portion of the door is defined between the first door facing and the second door facing after the first door facing and the second door facing are secured to the opposing sides of said frame,
   at least one of said facings comprising a compression molded, hardened rectangular sheet and a porous mat, the compression molded, hardened rectangular sheet comprising a sheet molding compound establishing first and second opposing major surfaces of the compression molded, hardened rectangular sheet, the porous mat having a continuous structure integrally molded into and permeated by the sheet molding compound, wherein at least one of the major surfaces made of the sheet molding compound is unbroken by the porous mat and the porous mat is directly adjacent to the core portion of the door.

4. The door of claim 3, wherein the porous mat is selected from the group consisting of a woven fiberglass mat and a knitted fiberglass mat.

5. The door of claim 4, wherein the porous mat is impregnated with sheet molding compound paste prior to molding the sheet molding compound paste into the compression molded, hardened rectangular sheet.

6. The door of claim 4, wherein the porous mat has a thickness of between about 0.0005 inch and about 0.0015 inch.

7. The door of claim 4, wherein the porous mat has a weave finer than 5 by 5 pics per square inch.

8. The door of claim 3, further comprising a core material disposed within the core portion of the door defined between the first and second facings.

9. The door of claim 3, wherein the sheet molding compound is formed from a paste comprising an unsaturated polyester.

10. The door of claim 9, wherein the sheet molding compound includes at least about 10% by weight chopped fiberglass.

* * * * *